(12) United States Patent
Gardner et al.

(10) Patent No.: US 6,981,224 B1
(45) Date of Patent: Dec. 27, 2005

(54) SYSTEM AND METHOD FOR CONDITIONALLY ASSOCIATING A PLURALITY OF ENABLED IMAGES WITH A PREDETERMINED IMAGE

(75) Inventors: Jules E. Gardner, Richboro, PA (US); Keith J. Gelles, Owings Mills, MD (US); Brian P. Sloyer, Avondale, PA (US)

(73) Assignee: Point Roll, Inc., Fort Washington, PA (US)

( * ) Notice: Subject to any disclaimer, the term of this patent is extended or adjusted under 35 U.S.C. 154(b) by 563 days.

(21) Appl. No.: 09/872,036

(22) Filed: Jun. 1, 2001

Related U.S. Application Data (62) Division of application No. 09/723,505, filed on Nov. 28, 2000.

(60) Provisional application No. 60/201,970, filed on May 5, 2000.

(51) Int. Cl.$^7$ ............................................... G06F 3/00
(52) U.S. Cl. ........................ 715/760; 715/808; 715/862
(58) Field of Search ................................. 345/859, 856, 345/858, 860, 861, 808, 804; 705/14; 715/760, 715/764, 765, 781, 804, 808, 810, 856, 858–861

(56) References Cited

U.S. PATENT DOCUMENTS

| | | | |
|---|---|---|---|
| 6,247,047 B1 * | 6/2001 | Wolff | 709/219 |
| 6,266,043 B1 * | 7/2001 | Robin | 345/858 |
| 6,286,045 B1 * | 9/2001 | Griffiths et al. | 709/224 |
| 6,370,537 B1 * | 4/2002 | Gilbert et al. | 707/101 |
| 6,401,075 B1 * | 6/2002 | Mason et al. | 705/14 |
| 6,442,529 B1 * | 8/2002 | Krishan et al. | 705/14 |
| 6,496,857 B1 * | 12/2002 | Dustin et al. | 709/219 |
| 6,654,784 B1 * | 11/2003 | Wei | 709/203 |

OTHER PUBLICATIONS

Dominy, Robert. "Focus on JavaScript". About.com, http://javascript.about.com/library/gloss/blmouseover_def.htm, p. 1.*

"JavaScript MouseOver Creator—2.0". DimSis Creations. Jul. 16, 2000. http://www.downlinx.com/proghtml/166/16691.htm, p. 1.*

* cited by examiner

*Primary Examiner*—John Cabeca
*Assistant Examiner*—Brian J. Detwiler
(74) *Attorney, Agent, or Firm*—Caesar, Rivise, Bernstein, Cohen & Pokotilow, Ltd.

(57) ABSTRACT

In a method for delivering information to a person accessing a banner website from a terminal located remote from the source of the banner website the terminal has an associated display upon which the content of the website is visually perceived by a person using the terminal and a cursor whose position is controllable by the person. The method includes providing initial signals from the source of the website or from another remote source when the website is accessed by the person to establish a banner area on the display, the banner area including banner information that is visually perceivable by the person when the website is accessed and plural sub-areas of the banner area having respective associations with additional visually perceivable information. The person is enabled to select any one of the sub-areas of the banner area to provide a selected sub-area, whereupon the person is provided with a first display of the respective additional visually perceivable information associated with the selected sub-area to provide reassociated information. The associations between the additional visually perceivable information and the sub-areas are altered and a second display of the reassociated information is provided.

18 Claims, 11 Drawing Sheets

SYSTEM AND METHOD FOR CONDITIONALLY ASSOCIATING A PLURALITY OF ENABLED IMAGES WITH A PREDETERMINED IMAGE

RELATED APPLICATION

This application is a Divisional of our earlier filed U.S. patent application Ser. No. 09/723,505, filed on Nov. 28, 2000, entitled METHOD AND SYSTEM FOR CREATING AND DISPLAYING IMAGES INCLUDING POP-UP IMAGES ON A VISUAL DISPLAY, which claims the benefit of Provisional application Ser. No. 60/201,970, filed May 5, 2000, whose disclosure is incorporated by reference herein and which is assigned to the same assignee as this invention.

BACKGROUND OF THE INVENTION

1. Field of the Invention

This invention relates to the field of creating and displaying images over a large computer network, and in particular, creating and displaying images including pop-up images.

2. Description of Related Art

The global interconnection of computers and computer networks is commonly referred to as the Internet. The Internet is a collection of smaller wide area and local area computer networks connected together thereby allowing the sharing of resources and facilitating data communication between computers and users. Graphical user interfaces called browsers allows users easy access to network servers and computers connected to the Internet and, in particular, the World Wide Web (WWW).

As a subset of the Internet, the WWW includes a collection of servers, computers, and other devices. Each server connected to the WWW may contain documents formatted as web pages or hypertext documents that are accessible and viewable with a browser utilizing hypertext transfer protocol (HTTP) such as Netscape Navigator, MOSAIC or Microsoft Internet Explorer, for example. Hypertext documents often contain hypertext links to other hypertext documents which can be accessed from the first hypertext document by activating the hypertext links. The term link refers to a selectable reference to another electronic document. Links are sometimes referred to as hot links, which when activated by clicking on them accesses the referenced electronic document or another document.

Hypertext documents, files, web pages or banners generally contain text, graphics, images, sound, and/or video, for example, and are generally written in a standard page or hypertext document description language known as Hypertext Markup Language (HTML). Using an HTML format, a web developer can specify the location and presentation of text, graphics, images, sound and video on the screen displayed to the user accessing the web page. Furthermore, a primary HTML document can be provided with a frame therein for permitting the display of secondary images within such a frame. For example, a banner advertisement can be displayed in a frame located within a primary HTML document. The image within the frame is essentially a miniature web page that can be scrolled, printed, or operated upon in substantially any other manner normally possible when operating upon primary HTML documents. This type of frame within a document is referred to as an iframe.

It is known in the art to provide a flash image or pop-up image wherein an associated flash image or pop-up image is displayed to the user when the user activates it, for example, by movement of an indicator on the primary HTML document. However, it is not possible to activate such an associated image by movement of an indicator on a primary document when the primary document is displayed within an iframe.

HTML format also allows a web page to contain links, such as the hypertext links described above, to other web pages or servers on the Internet. By selecting a link, a user can be transferred to the new web page which may be at a different geographical or topological location from the original web page.

Each server and file used to display a web page has a unique Universal or Uniform Resource Locator (URL) address associated with it. Using a conventional browser a user can select the web page or hypertext document using its URL address. Upon entering a URL address into a browser, for example the user's microprocessor-based device, such as a personal computer, establishes a connection with the web page or hypertext document. The initial web page or hypertext document is transmitted from the server storing this web page or hypertext document to the user's microprocessor-based device and is displayed thereon. It should be understood that in addition to personal computers, other suitable microprocessor based devices such as portable computers, Internet ready cellular phones, personal digital assistants and Internet appliances can also communicate with servers using the Internet.

A web page can include a number of graphic images or elements, often referred to as banners, which are displayed in conjunction with the web page, often in a top portion of the page. These graphic images are typically stored as separate files on the same or different server, and also have associated URL addresses. When a web page is initially transmitted from a server to a user's microprocessor and based device, the graphic images or banners are provided to the user as part of the page.

Easy access to the WWW and the ability to create aesthetically pleasing web pages have increased the amount of advertising and other promotional material created for and displayed on web pages. For example, a clothing manufacturer may have a web page describing the company and the clothing and accessories that the company manufactures and sells. A portion of the web page may include advertising information or banners that include images of the latest fashions sold by the manufacturer or the sizes and amount of clothing articles the manufacturer has in stock. The clothing manufacturer may also contract with the owners or operators of other web pages to provide advertisement banners displaying the clothing manufacturer's goods.

Personal computers generally include a system unit, a video display terminal, a keyboard, and a mouse. Generally, a mouse includes one or more buttons typically located on the top of the mouse. The mouse is commonly used as a relative pointing device. By moving the mouse across a flat surface, the user can control movement of a mouse pointer as seen on the video display terminal.

A mouse or other input pointer device is displayed as a cursor or indicator, e.g., a small arrow or other symbol, on the video display terminal that moves as the user moves the mouse or other pointing device. The area of the screen where the mouse pointer appears can serve as a target for action. To select items or to choose commands displayed on a video display terminal traditionally requires that the user manipulate the mouse or other device to place the pointer or the cursor proximate to the desired target, and press one or more mouse buttons or other actuators to produce a "click" to indicate some action. One skilled in the art will recognize the difference between clicking and dragging a mouse button. The term "click" refers to the act of pressing a mouse button down and then immediately releasing it. The term "drag" refers to pressing and holding the mouse button down while moving the mouse and not releasing the button. The phrase "to click on" means to select an object displayed on the video display terminal by moving the mouse pointer to the position of the object and clicking a mouse button.

In a conventional web page, if a user clicks on a banner, a new web page is generally displayed on the user's browser. Each web page may contain similar links to other web pages, hypertext documents, and websites, for example. Activating a link available on a banner in this manner provides the user with an ability to navigate or move to and display or download different documents, pages, banners, sites, or other information via the computer network. Thus, when the user places the graphical representation of a cursor over a desired link, and clicks one of the mouse buttons at the link, the user can go to an alternate site.

As set forth, to activate a hot link in a banner in traditional applications and programs users must click on the banner to arrive at another website. As known to those skilled in the art, many users ignore suggestions that appear on banners such as click here or click now. The fact that many users do not click on these banners may be attributed to apprehension that they will arrive at an unknown or undesired website, or that they cannot return to the website from which they came. The present invention provides a method by which a user no longer needs to click on the banner to determine the nature of the website that is indicated by the link.

SUMMARY OF THE INVENTION

A system and method for delivering advertising messages to a person accessing a banner web site from a terminal located remote from the source of the banner web site, the terminal having an associated display upon which the content of the web site is visually perceived by a person using the terminal and a cursor whose position is controllable by the person. The method includes providing initial signals from the source of the web site or from another remote source when the web site is accessed by the user to establish a banner area on the display panel wherein the banner area includes banner information that is visually perceivable by the person when the web site is accessed and the banner area includes plural sub-areas of the banner area. The person controls the cursor to position the cursor on any one of the sub-areas of the banner area to provide a selected sub-area, whereupon the person is automatically provided with respective additional visually perceivable information associated with the selected sub-area, the additional visually perceivable information being provided without requiring other action by the person, and the additional visually perceivable information being imperceivable by the person until the cursor is located on the selected sub-area. The additional visually perceivable information is provided substantially outside the bounds of the banner area and also includes audio information, video information, and mixed media information. The additional visually perceivable information remains perceivable to the person as long as the cursor remains on the selected sub-area. The initial signals carry all the instructions necessary for enabling the terminal to establish the additional visually perceivable information when in receipt of signals transmitted from a further web site in response to the instructions. The source of the web site or another source are accessed for receiving the transmitted instructions upon which the instructions operate to provide the additional visually perceivable information.

Therefore, the system enables a user on a web site to traverse a banner presented on the web site to display an image in response to the traversing of the banner by providing the banner with a hot spot having an associated image and activating the hot spot when the indicator traverses the hot spot. This enables the associated image of the hot spot when the traversed hot spot is activated in order to provide an enabled image. When the indicator is moved to the enabled image the enabled image is retained while the indicator is disposed on the enabled image. If the enabled image is substantially adjacent to the banner and the indicator is moved from the enabled image to the banner the enabled image is retained. When the indicator is moved off both the enabled image and the banner the enabled image is removed. The user is transported to a further web site in response to clicking on the enabled image. The banner is provided with a further hot spot having a further associated image and the further associated image is enabled in response to clicking the further hot spot.

BRIEF DESCRIPTION OF THE DRAWINGS

The advantages and aspects of the present invention will be more fully understood in conjunction with the detailed description which follows, and the accompanying drawings, wherein.

DETAILED DESCRIPTION OF THE INVENTION

During the course of this description, like reference numbers will be used to identify like elements according to different views that illustrate the invention.

Figure 1:
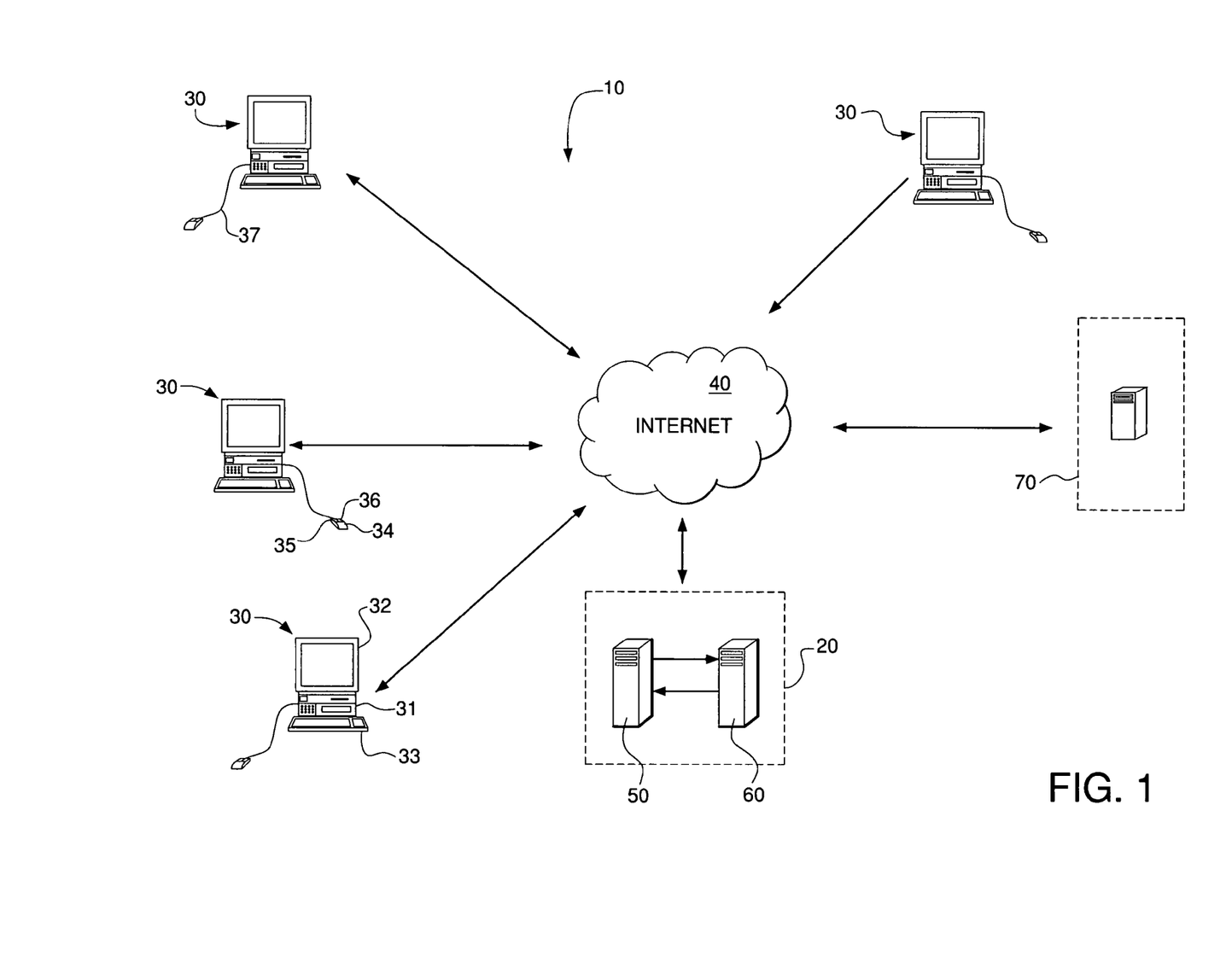
FIG. 1 illustrates a block diagram of the connectivity of a system according to the present invention.

As illustrated in FIG. 1, a system 10 according to the invention includes server hardware and software ("server") 20 and suitable microprocessor based devices 30 that are communicable with one another through the global interconnection of computers and computer networks commonly known as the Internet 40. Microprocessor based devices 30 can take the form of personal computers, portable computers, Internet-ready cellular phones, personal digital assistants (PDAs) and Internet appliances or other suitable devices being communicable with the server 20 using the Internet 40. In the illustrated example of FIG. 1, where devices 30 each take the form of a personal computer, suitable Internet browser software such as Microsoft Internet Explorer or Netscape Navigator can be used to communicate over the Internet 40 with server 20 as is well understood by those skilled in the pertinent art.

Microprocessor based device personal computer 30 includes a system unit 31, a video display terminal 32, a keyboard 33, and a mouse 34. The mouse 34 is commonly used as a relative pointing device. It should be pointed out at this juncture that any conventional input device or actuatable pointing device capable of indicating or representing locations on the video display terminal, e.g., a trackball, light pen, digitizing tablet, speech recognizing system, etc. can be used in lieu of a mouse, although the remainder of this specification will be directed to the use of a mouse 34. A typical mouse 34 includes one or more mouse buttons 35 and 36 generally located on the top of the mouse. A cable 37 connects the mouse 34 to the system unit 31. By moving the mouse 34 on a surface, the user controls the movement of a cursor or indicator that is visible on the video display terminal 32. The mouse 34 is a relative pointing device because the movement of the mouse is not defined by limitations, i.e., the placement of a mouse 34 on a surface does not directly correlate to a specific location on a video display terminal 32.

To select items or to choose commands on a video display terminal 32 generally requires that the user press one or more buttons 35, 36 on the mouse 34 to produce a click. The mouse 34 is moved by a user to manipulate a mouse pointer or cursor 110, the location of which changes as the mouse 34 is moved.

A website server 20 typically includes an operating system and a relational database. The application server 50 handles application operations between devices 30 and the database server 60. Because conventional databases typically cannot directly interpret commands written, for example, in HTML, application server 50 works as a translator between devices 30 and database server 60 as is well understood. Database server 60 processes database queries as is also well understood and communicates with application server 50. Application server 50 preferably includes an NT server and an Internet information Server (IIS). Database server 60 preferably also includes an NT server and an SQL server, although any other suitable server could of course be utilized as is well understood by those of ordinary skill in the pertinent art.

It should be understood that any other suitable operating system and server software combination which fetches a requested electronic document and sends it to the requesting suitable microprocessor based device 30 can be used as a matter of simple design choice.

Web pages on a web server 20 can reference an advertising server 70. Advertising server 70 has conventional data insertion tools for causing one or more advertisements, such as banner advertisements that also serve as HTML links, to be displayed when a page of information, such as a file or database information, is returned to a user who accesses a website. For purposes of the present invention, the term "banner" is meant to be construed very broadly and includes any information displayed in conjunction with a web page wherein the information contained therein is not part of the same file as the web page. That is, a banner includes anything that is displayed or used in conjunction with a web page, but which can exist separately from the web page or which can be used in conjunction with many web pages. Banners can include information representing still or moving graphics, textual information, video, audio, and animation, for example. A banner can be stored on server 20 and typically serves as a link to other locations such as computer sites, websites, web pages, or other banners.

Although it is not shown in order to simplify the drawings, it is apparent to one skilled in the art that the microprocessor based device 30, remote from the servers 50, 60, 70, includes a CPU, memory, input/output lines, network connections, LANS, and Internet connections. The microprocessor based device 30 may also include an input device such as a disk drive of CD-ROM drive. A person of ordinary skill in the art will also understand that memory associated with the microprocessor based device 30 contains additional information, such as application programs, operating systems, and data, for example. Such additional information is not shown in FIG. 1 in order to simplify the drawings.

Figure 2:
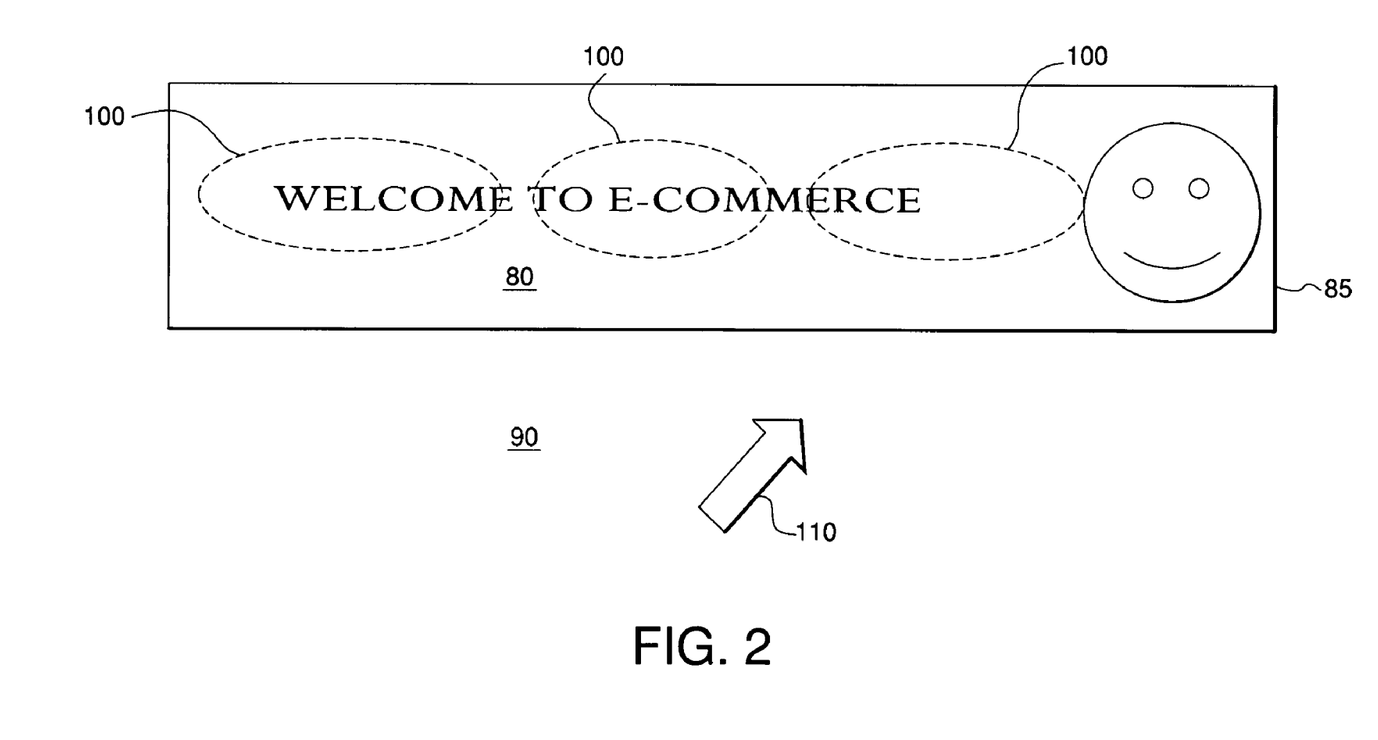
FIG. 2 illustrates an exemplary banner advertisement and hot spots appearing on a video screen according to one exemplary embodiment of the present invention.

Referring now to FIG. 2, the banner is illustrated in context according to one exemplary preferred form of the invention. The method according to the present invention preferably enables users to point and roll a mouse 34 or other indicator device over a banner advertisement 80 disposed in a frame 85 and containing hot spots 100 on a web page 90. Hot spots 100 are those areas of a graphic object or a section of text that are capable of enabling associated functions when activated. Hot spots 100 are particularly common in multimedia applications where activating a hot spot 100 can cause the application to display a picture, run a video, or open a new window of information on a display.

The hot spots 100 shown in FIG. 2 are disposed in a series and are shown in phantom since they may or may not be visibly distinguishable in the banner advertisement 80 unless the mouse cursor 100 traverses the hot spots 100. The use of hot spots 100 is well known to those skilled in the art. In the example shown in FIG. 2, the cursor 110 that is responsive to user interaction with a mouse connected to the microprocessor based device 30, for example, is located below the banner advertisement 80 on the web page 90.

Figure 3:
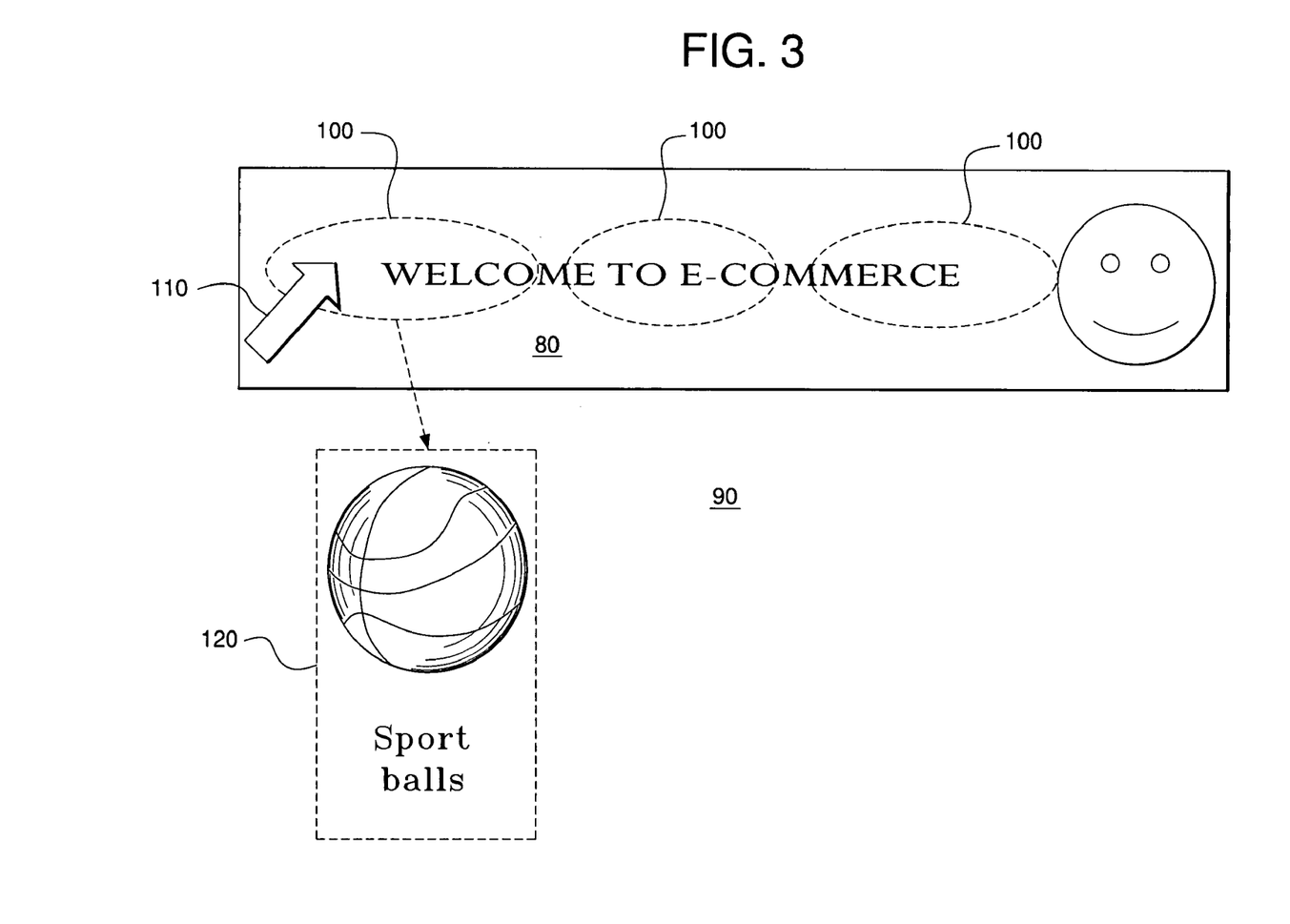
FIG. 3 illustrates an image emanating from a banner advertisement according to the present invention.

Referring now to FIG. 3, each of the hot spots 100 is associated with a predetermined or predefined associated image 120. One image is associated with each hot spot 100. The enabled images can be flash images, static images, and animated images. They can have text and color and any other features conventionally available in pop-up images, wherein pop-up images are understood to be mini web pages that can contain any content in a regular web page and that can be displayed on top of a current page. The enabled images can be stationary images or scrollable images. Furthermore, the enabled images can have any other capabilities normally available in an image at a website. The images 120 which can be enabled by traversing their associated hot spots 100 with the cursor 110 can include a variety of items, including, but not limited to any particular product, for example, auto parts, sports equipment, and houseware items. As shown in FIG. 3, an image 120 of a basketball is associated with one hot spot 100.

Upon traversing or positioning the mouse cursor 110 within a predetermined proximity of the hot spot as shown in FIG. 3, the hot spot 100 is activated without the user clicking on any mouse buttons 35 and 36 and the image 120 appears to drop down or emanate from the banner advertisement 80. Furthermore, no links or connections to other banners or web pages are initiated by positioning the mouse in this manner in the preferred embodiment. The automatically displayed image 120 is determined according to the website accessed and can exemplify the type of product or content available at the website. It is important to note that the user, however, does not need to click on either the right or left button of a mouse in order to activate or select the hot spot 100 and enable the associated image 120. As shown in FIG. 3 the image 120 associated with a hot spot 100 is a basketball which in turn is associated with the website to which it is linked.

If the user is interested in learning more about an image 120 displayed on the web page, the user can interact with the mouse to move the cursor 110 to the image 120. The image 120 as shown in FIG. 3 is retained on the display screen until the cursor 110 is moved away from the area defined by the image 120. In the case where the image 120 is adjacent to the associated hot spot 100, or substantially adjacent to the associated hot spot 100, the image 120 can also be retained when the cursor moves from the image 120 back to the hot spot 100. In the latter case the image 120 is maintained until the cursor is moved from both the image 120 and the hot spot 100.

A link can be provided in the image 120 so that when the cursor 110 is located in an area defined by the image 120 the user can click on a mouse button to thereby request access to another web page or another URL address as is conventionally understood. It should be understood that the images 120 displayed can be of different sizes and shapes. The images are stored on a server such as the server 20 or the server 70.

A user viewing a web page 90 with a banner advertisement 80 displayed thereon can easily select among multiple hot spots 100 according to a preferred embodiment of the present method without having to click on a banner by merely positioning the pointer 110 within a predetermined proximity of, or upon, one of the hot spots 100. As each hot spot 100 is traversed in this manner its corresponding image is enabled and the images corresponding to the other hot spots 100 are not enabled.

The displays provided by this system will hereinafter be referred to as "Pointroll" displays and the system for generating them the "Pointroll" System. In the preferred embodiment of the invention, the displays are banner advertisements. With a Pointroll banner advertisement the user does not have to click on a mouse button or other indicator in order for a pop-up advertisement to appear on the user display screen.

Figure 4:
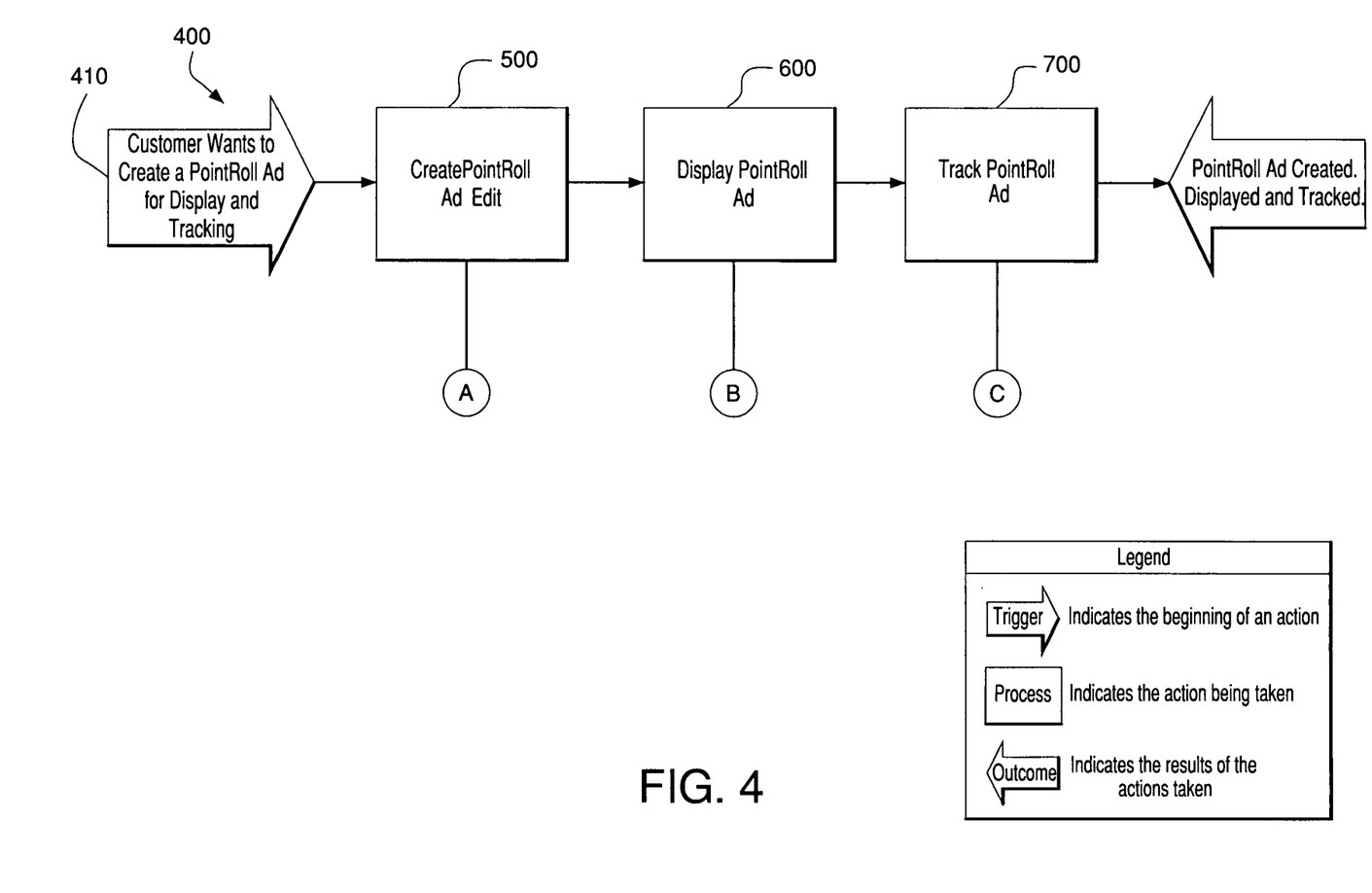
FIG. 4 illustrates the high level process overview of the system of this invention. (The system being referred to as the "Pointroll System")

Referring now to FIG. 4, the high level process overview 400 of the Pointroll System is shown. Initially, a customer (i.e., a person desiring to utilize the Pointroll System to create a Pointroll banner advertisement for its goods or services) visits a Pointroll site to create the advertisement for its display and tracking as depicted in block 410. The advertisement is created in the process designated by the functional block 500, displayed on a video monitor as indicated by the functional block 600, and tracked as designated by the functional block 700.

Figure 5:
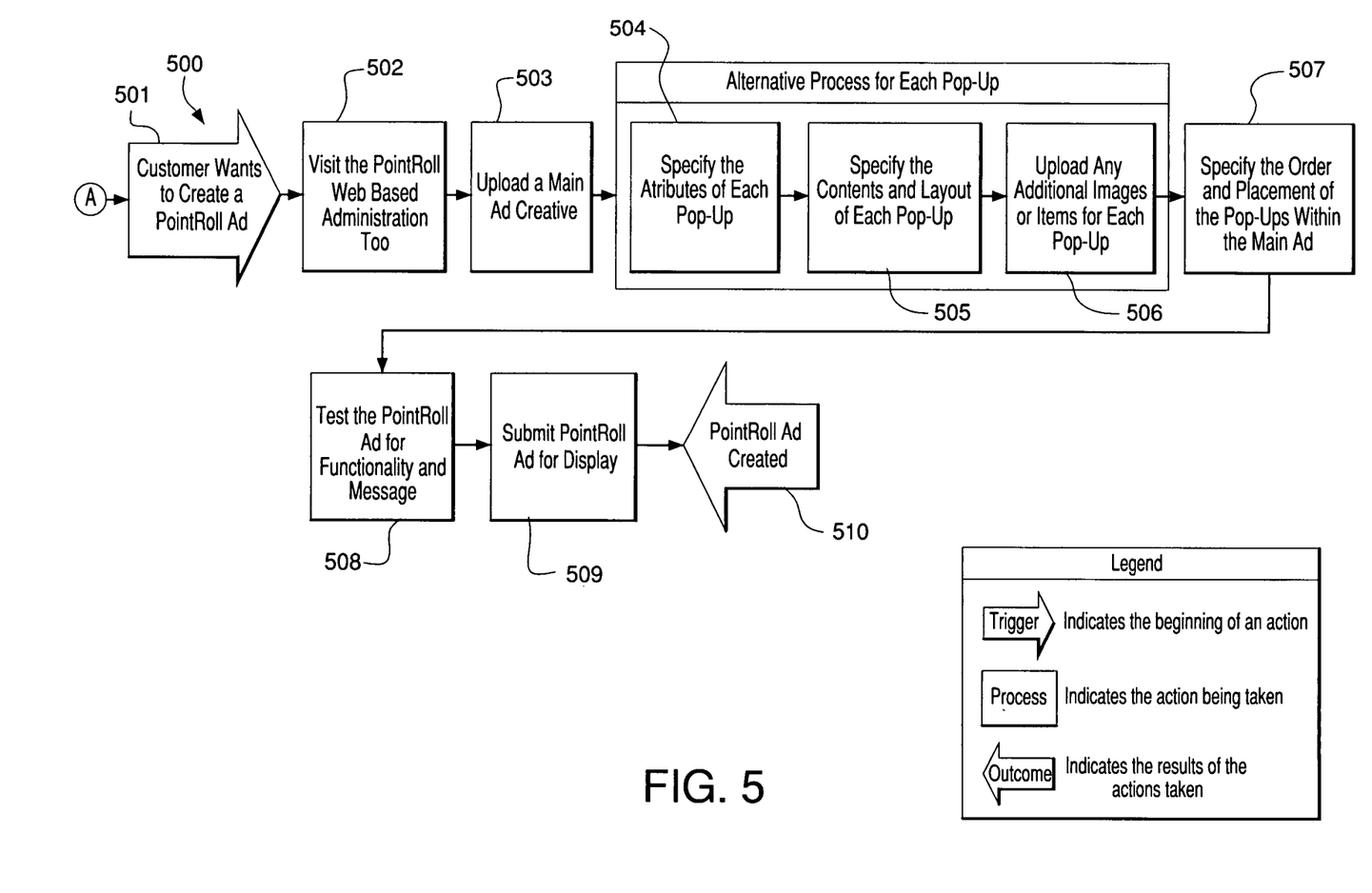
FIG. 5 illustrates step A of the process of FIG. 4.

Referring now to FIG. 5, a preferred advertisement creation process using a Pointroll administrative tool is represented by the process overview 500. When a customer wants to create an advertisement as depicted by block 501 the web based administration tool is used as designated by block 502. The web based administrative tool allows an advertiser to create or upload its banner advertisement and then create and rotate the pop-up images associated with the banner advertisement. The customer thus uploads the main graphic of the banner as depicted by block 503 and specifies its attributes. The main graphic 503 can also be referred to as a creative 503. The attributes of the banner advertisement specified by the user can include the height and length of the banner background, i.e., the number of pixels, the number of pop-up advertisements that are to be associated with the banner, the background color, the font size, and the style and the color of the banner, for example.

The attributes of the banner, such as size and color of each pop-up to be associated with the advertisement, are specified as depicted by block 504. In one embodiment of the invention attributed such as the content and layout of each pop-up are predetermined by the customer as depicted by block 505. The customer can choose graphic and text content for each pop-up, in addition to video, JAVA applets, and audio, for example. As is conventionally understood, when non-text items are selected the appropriate data is uploaded to the server for each pop-up as depicted by block 506. The order and spatial placement of the pop-up advertisements within the banner are specified either manually or automatically as depicted by block 507. In addition, the advertisement banner can be divided into three, four, five or more sectors. The number of sectors selected is a matter of design choice.

The advertisement is tested for functionality as depicted by block 508. In order to facilitate this the administration tool has a button or other means of indication that allows a user to immediately view the created advertisement and test it for functionality and performance. If the advertisement is satisfactory to the customer it is stored for later use as a Pointroll advertisement within the Pointroll System as depicted by block 509. Relevant data is stored in a database for the advertisement and the creation of advertisement is thus complete as depicted in block 510.

The customer has the option of updating a previously specified advertisement as well. To edit a pop-up banner relevant previously entered data can be automatically populated to enable easy editing for a use of that data. Editing can either change the order of the sectors, for example, or the advertisement can be changed entirely. The tool represented by the process flow 500 is used to specify the placement of the pop-up within the main advertisement banner and the order and placement of the pop-up(s) associated with the banner. Messages in pop-up advertisements are optionally substituted with alternative messages, as desired.

Figure 6:
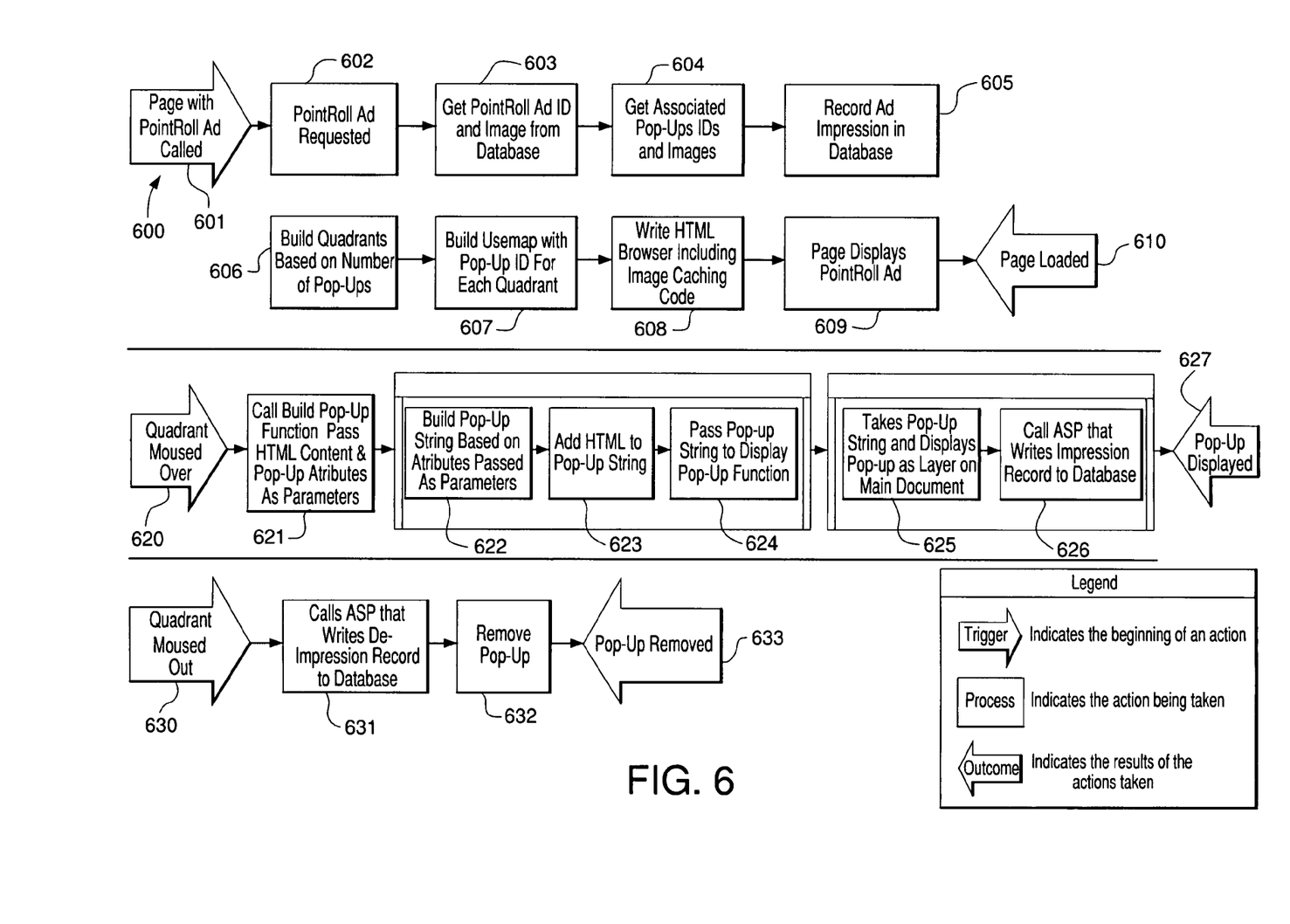
FIG. 6 illustrates step B of the process of FIG. 4.

Referring now to FIG. 6, the advertisement display process flow 600 is illustrated. After a Pointroll advertisement is created according to the process flow 500, a display process is triggered when the web browser makes a request for a page (designated by block 601) that includes the advertisement. The request is made to a server database that has stored one of the created Pointroll advertisements and its associated images. The request to the server is depicted in block 602. For each Pointroll advertisement requested, the database must determine which banner is to be served and which pop-up advertisements are associated with the banner in the requested advertisement.

Each banner advertisement and, separately, each of its associated pop-up images has its own unique identification (ID). A Pointroll advertisement ID and the banner image are retrieved from the server database as shown by block 603. Associated Pointroll advertisement pop-up IDs and images are retrieved from the database as depicted by 604. An advertisement impression or banner advertisement, i.e., that the advertisement has been served to a requesting device, is then recorded in a database as depicted by block 605.

The number of sectors to be formed in the banner is then determined according to the number of pop-up images, or panels, associated with the banner as depicted by block 606. For example, if four pop-up images are associated with the banner, the banner is divided into four sectors. In this case, the sectors are referred to as quadrants. A "use" map is built and a pop-up ID is assigned to each sector of the banner as depicted by block 607. The use map associates a block of code that follows the image and specifies the coordinates and content of each sector.

When the size of a banner is a known number of pixels and four sectors, e.g. four quadrants, are desired the known number of pixels for the banner is divided into four equal parts. HTML formatting permits the browser to build the image based on the information entered by the customer. The server sends the image caching code which includes information with respect to the associated pop-up and all of the mouse over commands to the browser as depicted by block 608. The information representative of the actual pop-up images are not sent by the server at this time. The page including the Pointroll banner advertisement is loaded in the browser as depicted in block 610 and the browser displays the advertisement on the associated video monitor as depicted by block 609.

Most generally, the advertisements of the present invention can be static, dynamic, animated, or any other type of images. If an animated image is used the IDs of a plurality of frames can be retrieved in accordance with block 604 along with instructions for looping through the plurality of frames for later execution when the animated image is enabled. The instructions for the animation of the image can be provided in HTML format.

As a user mouses over a sector of a banner advertisement as designated by block 620 a build pop-up function is called. This causes the HTML contents and pop-up attributes to be passed as parameters to the browser as depicted by block 621. It also causes the information representative of the actual pop-up images to be obtained. The first time such image information is obtained the browser must access the Pointroll System web site to get the information. In this case, there may be some delay while the system performs the access to get the data forming the image. In the preferred embodiment the images are cached when they are first used so that subsequent rollovers can be speeded up by passing information to the browser from the previously loaded cached information.

A pop-up string of code based on the attributes passed as parameters is built as depicted by block 622. HTML is added to the pop-up string as depicted in block 623 for the browser to build the image, and the formatted pop-up string is passed to the display pop-up function as depicted in block 624. It will be understood that the Pointroll web server serving the banner and the pop-up image can be any server. For example, it can be a hosting server.

The display pop-up function receives the pop-up string and displays the pop-up image as a layer on the visual page as depicted in block 625. As depicted in block 626 a script is called to write another impression record to a parameter database in order to record the start time that the pop-up was displayed. The parameter database can be any database used for storing parameters for measuring the performance of the advertisement and its associated images. The script provided in accordance with block 626 can be implemented using Active Server Page (ASP) technology or any other kind of script. In this manner, the display of the pop-up image is achieved as depicted in block 627.

As a user mouses away from the activated sector as depicted in block 630 the ASP is called to write a deimpression record to the database as depicted in block 631 and remove the pop-up in block 632. This action removes the pop-up from the view of the user as depicted in block 633. Using the parameter database to record the impression and deimpression times in this manner permits a determination of the length of time each pop-up is displayed.

The parameter database tracks how many times an advertisement is requested. This database records parameters relating to the performance of each advertisement that is called from the database where it is stored. By storing the relevant data in a database in this matter, pop-ups can be rearranged and displayed dynamically allowing an advertiser to make immediate changes based on different and rapidly changing advertisement campaigns, for example. The identity of each pop-up's banner association is required in order to make this determination. Many pop-ups have a relationship with a plurality of banner advertisements, i.e., the same pop-up can appear on different banner advertisements.

Figure 7:
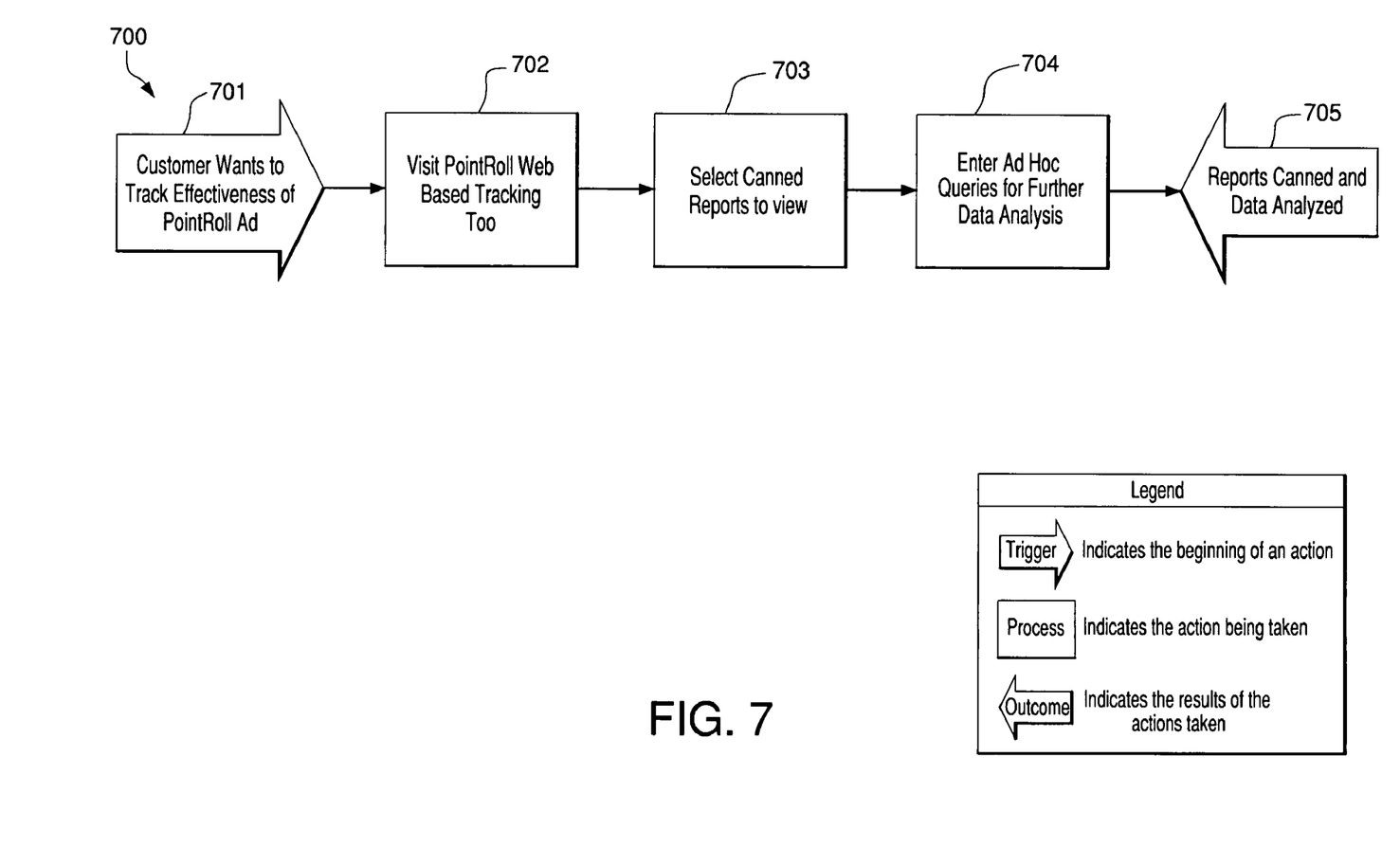
FIG. 7 illustrates step C of the process of FIG. 4.

Referring now to FIG. 7, an overview of the tracking tool process flow 700 is illustrated. When a customer wants to track the effectiveness of a Pointroll advertisement designated by block 701 the web-based tracking tool is accessed as depicted in block 702. The customer can select from preconfigured reports as depicted by block 703. The preconfigured reports use predetermined criteria for tracking the performance and effectiveness of an advertisement. Alternatively, the customer can enter queries for further data analysis as depicted in block 704 to select its own desired parameters and create a customized report. In either case reports are created and the data is analyzed as depicted by block 705.

Figure 8:
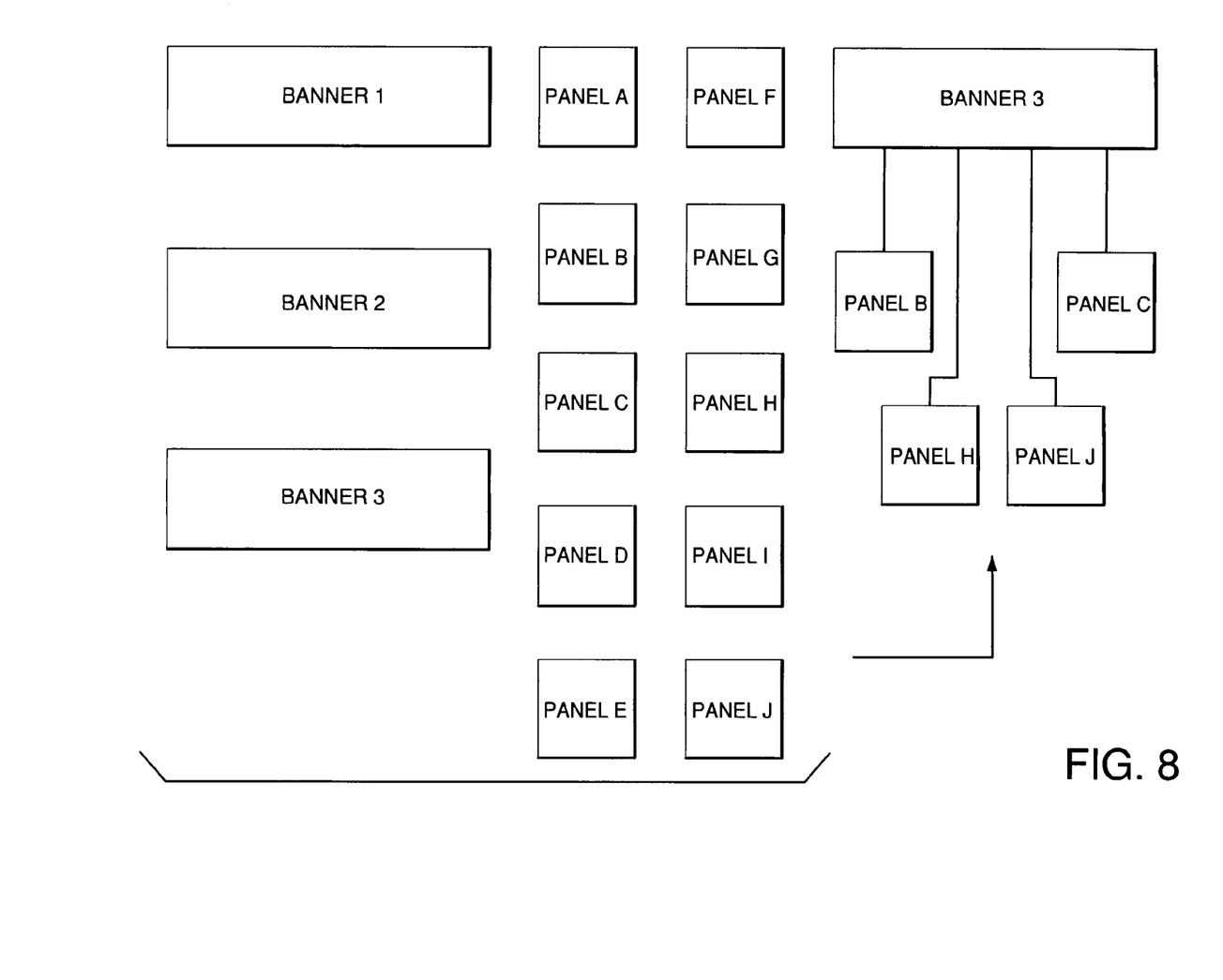
FIG. 8 illustrates a method for associating banner advertisements with selected pop-up images according to the present invention.

In FIG. 8 there is shown a methodology for joining, or associating, banner advertisements, such as banner advertisement 80, to predefined associated images, such as image 120 of FIG. 3. In FIG. 8 the banner advertisements are represented as Banners 1,2,3 and the associated images are represented by Panels A–J. The Panels A–J are selectively associated and reassociated variously with the Banners 1,2,3 in accordance with the methodology of FIG. 8.

It is known for the various Panels A–J to be associated with a banner such as Banners 1,2,3 to form a banner advertisement as previously described. In one embodiment of the invention the various Panels A–J are associated with their sectors within their assigned Banners 1,2,3 permanently, for the life of an advertising campaign. The associating, or stitching, operation can be performed by an advertising agency. When the Panels A–J are stitched in this manner they are associated with the HTML coding that will determine how to process them later.

In a preferred embodiment of the invention means are provided for an advertiser to better determine an advertisement's performance in order to be able to pay accordingly. Billing for the advertisements can be determined by the number of views or impressions of a banner advertisement made by various users or by the number of viewers that display at least one panel associated with the banner at least one time. The billing can be, for example, a predetermined amount per view, per impression or per viewer. It can be a flat rate that covers the costs up to a predetermined value of a selected monitored parameter.

The billing can also be determined according to any other parameter representative of the performance of an advertisement that is capable of being measured and monitored. For example, parameters such as an interaction rate can be used. The interaction rate can be defined as the number of times viewers move a mouse over a sector of a banner and see an extra advertisement disposed within its associated image. The charge for this event can be different from the charge for merely viewing the extra advertisement. Additionally, billing for services in accordance with the invention can be determined by the number of clicks on the activated images. Clicks on the activated images, and their corresponding links to other websites, could be charged at a different rate than the rate for merely viewing the extra advertisement of the associated image.

One method for charging customers is to use a flat amount per number of impressions, for example, thirty dollars per one thousand impressions. Another method for charging customers is to charge the amount per unit number of impressions along with an additional charge depending on parameters such as the number of pop-up panels that are viewed, the time duration during which an image is viewed, the number of trips to other websites, and any of the other monitored parameters, combinations of monitored parameters, or weighted combinations of monitored parameters.

In order to charge appropriate rates to advertisers for the value of the services provided in accordance with the present invention as determined by the monitored parameters a number of reports are provided. For example, reports can be provided on the number of views or the duration of the impressions of the panels that occur during a reporting period. The click through rate is also determined and reported. Furthermore, if the panels are interchanged with each other in accordance with the stitching invention of the present invention, determinations can be made and reports generated on each of the parameters when a selected panel is in each of its possible positions. Thus, determinations can be made and reports can be provided setting forth which sectors have the most traversals, which have the longest impressions, and which positions are preferred for each panel.

The reports provided in this manner can be used to dynamically change which images are associated with a banner while an advertisement campaign is in progress. For example, as shown in FIG. 8, an advertisement campaign can include three banner advertisements: Banner 1, Banner 2 and Banner 3. The advertisement campaign can also include ten associated images disposed upon the individual Panels A–J. The Banners 1,2,3 are each divided into four sectors, and one of the Panels A–J can be associated with each of the four sectors of the Banners 1,2,3. Furthermore, a differing Panel A–J can be associated with each of the sectors of Banners 1,2,3 each time a Banner 1,2,3 is served.

When using the monitored parameters to optimize an advertisement, a determination is made at the time an advertisement is served whether the Banner 1, the Banner 2, or the Banner 3 is optimum for display on the web page or any other kind of visual display where the advertisement may be viewed. The monitored parameters are also used to determine which of the Panels A–J would be most effective at each sector of a selected advertisement.

When optimizing the advertisement in the example of FIG. 8 it can be determined that a specified Panel A–J has a longer average display time when it is associated with one of the Banners 1,2,3 than when it is associated with one of the other Banners 1,2,3. Furthermore, it can be determined that the specified Panel A–J has a longer average display time when it is associated with a particular one of the sectors of its associated Banner 1,2,3. In this manner an optimized advertisement is determined and each time the advertisement is served using the method of the invention.

In the example shown in FIG. 8, the Banner 3 is selected to be served and the Panels B, H, J, C are selected for association, respectively, with the first, second, third and fourth sectors of the Banner 3. However, it will be understood that the next time an advertisement is served a different optimization criteria may have changed and a different Banner 1,2,3 may be selected. Furthermore, the next time the advertisement is served any of the Panels A–J may be associated with any of the sectors of the selected Banner 1,2,3.

Furthermore, it will be understood that different associations between the Banners 1, 2, 3 and the Panels A–J can be optimum under different circumstances. For example, the optimum associations can be different at different times of the day, different days of the week, or for different categories of web sites, e.g. sports sites, business sites or news sites. Additionally, the optimum association can be different for different classes of individuals if demographic information on individual viewers is known.

Figure 9:
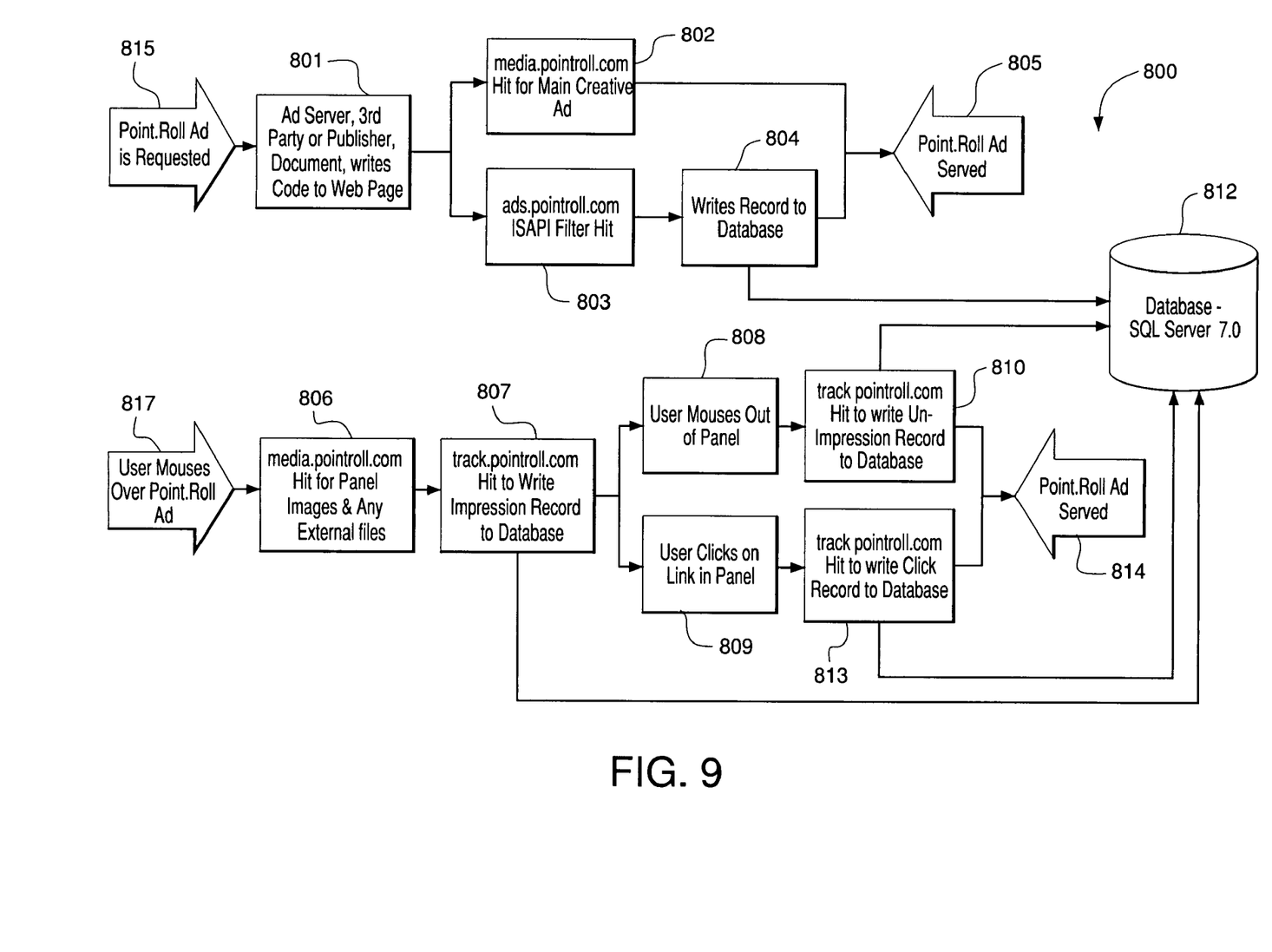
FIG. 9 illustrates a process flow for enabling the associated images of the present invention.

Referring now to FIG. 9, there is shown the process flow 800 wherein a Pointroll advertisement produced according to the present invention is requested and provided. When a Pointroll advertisement is requested as indicated in block 815 an advertisement serving company writes the code of an advertisement to a web site as depicted by block 801. This includes a banner image portion of the advertisement requested as depicted by block 802 and an associated images portion as depicted by block 803. The advertisement is served as depicted by block 805 and written into the Pointroll database 812 for the Pointroll portion as depicted by block 804.

When a user mouses over the advertisement as depicted by block 817 and a "hit" for a panel is determined as depicted by block 806 an impression is written to the database as depicted by block 807. Two possible events can follow the hit. The user can mouse out of the panel as depicted by block 808 or the user can click on a link within the panel to go to a different web page as depicted by block 809. If the user mouses out of the panel an unimpression is written to the database 812 as depicted by block 810. If the user clicks to another web page a click record is written to the database 812 as depicted by block 812. The process flow 800 is then complete as depicted by block 814.

Figure 10:
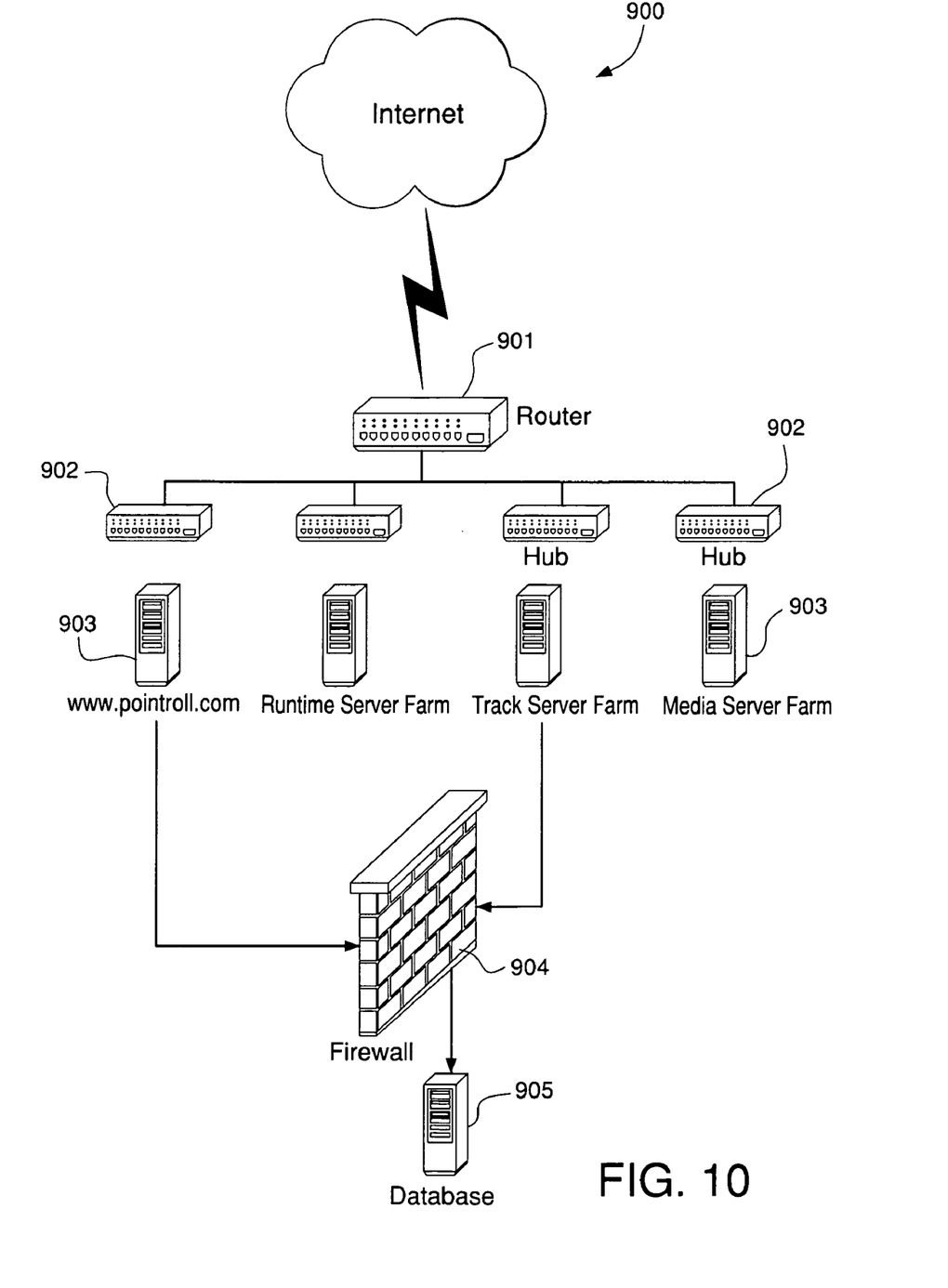
FIG. 10 illustrates a system architecture upon which the system of the present invention can operate.

Referring now to FIG. 10, there is shown one exemplary system architecture 900 upon which the Pointroll System of the present invention can operate. In the system architecture 900 a router 901 communicates with the Internet. The communication between the router 901 and the Internet can be by way of Level 3 communications. The router 901 is coupled to a plurality of hubs 902. In the preferred embodiment of the invention a separate hub 902 is provided for each server farm 903. The database 905 of the system architecture 900 is shielded from the server farms 903 by a firewall 904.

A visual display having the banner advertisement and its associated pop-up images can be a web page or any other type of document or visual display page. For example, it can be a conventional display page having an HTML frame object. The HTML frame object can be an "iframe" element of the display page wherein a banner advertisement 80 can be displayed within the iframe element. For example, the banner advertisement 80 can be displayed within an iframe object 85 of web page 90 in FIG. 2. In this embodiment, the HTML frame object for displaying the banner advertisement 80 is treated as a separate document within the display page, which can be a primary publisher page. The use of the HTML frame object in this manner can prevent any errors in the loading of the banner advertisement 80 from affecting the loading of the primary publisher page.

However, in this method two frames with origins in different websites cannot communicate due to limitations placed by the Javascript object model. The different websites originating the frames in this example can be referred to as different subdomains. Thus, in accordance with the present invention, when the HTML frame object is used for providing banner advertisements in Javascript based advertisements, the content of the banner advertisement and the content of the primary publisher page are hosted on the same website source in order for them to be able to communicate and operate as set forth herein above.

Thus, in accordance with the preferred embodiment of the present invention the publisher or other hosting party can host a generic file created by the method of this invention in each subdomain. The Pointroll advertisement tag having the block of code as created by the method of this invention and as required for displaying the associated images goes into the advertisement serving rotation as does any other advertisement tags being used in the rotation. In order to permit the advertiser or advertisement server engine to select advertisements according to the present invention, the advertisement tag also references the generic files that the publisher hosts in its subdomain. By doing this, the source of the primary web page and the source of the advertisement frame are the same subdomain, the subdomain of the publisher. This allows the communication necessary for the Pointroll advertisements to operate. It will be understood that any method wherein the primary publisher page and the Pointroll advertisement are served from the same subdomain can be used to permit the required communication.

Figure 11A:
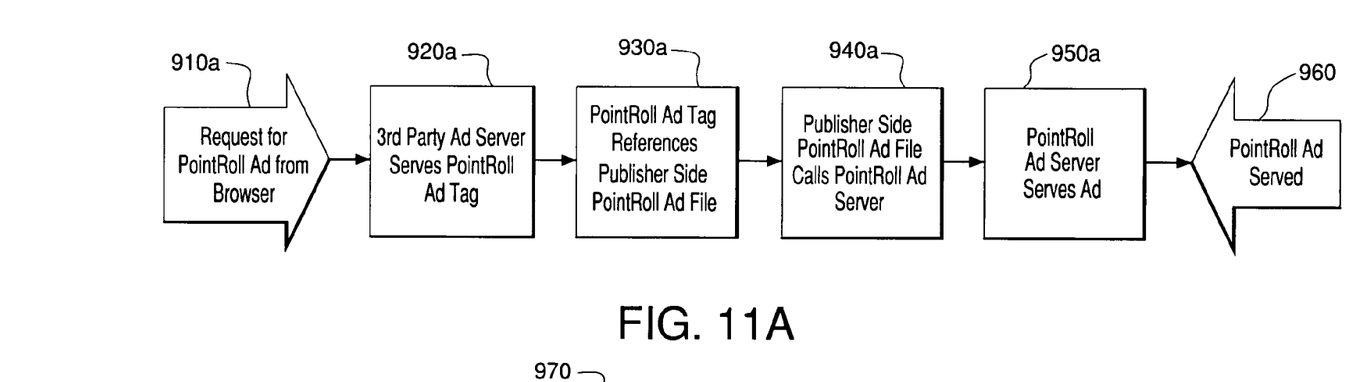
FIGS. 11A,B illustrate a process flow and block diagram of a process flow for permitting the use of an iframe window in a visual display for displaying images from different sources.
Figure 11B:
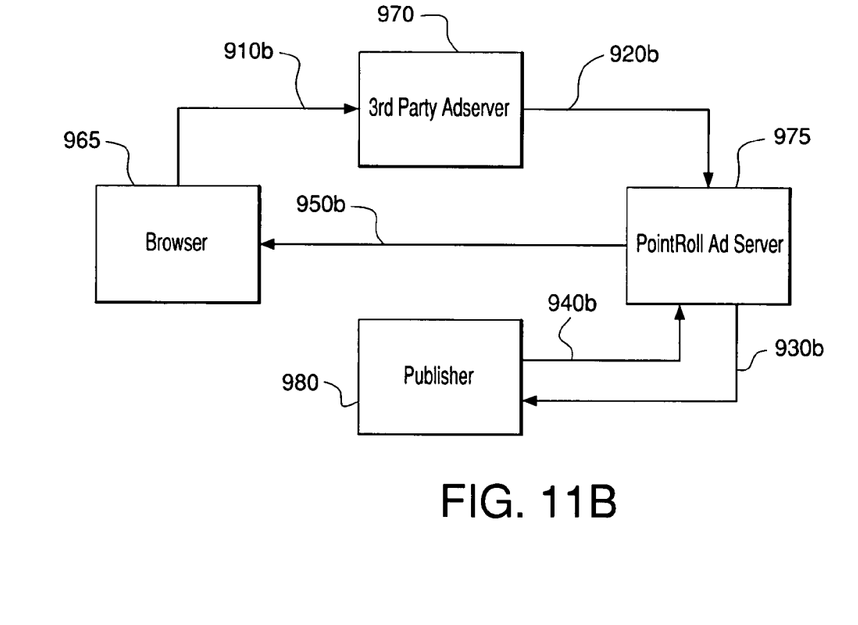

Referring now to FIGS. 11A,B, there is shown the iframe display process flow 950. The iframe display process flow 950 enables a user of the present invention to obtain communication between a banner advertisement 80 being displayed in an iframe 85 of a display page 90 and the associated images 120 of the banner advertisement 80. This communication is necessary for the coding of the banner advertisement 80 and the images 120 to operate in accordance with the present invention. In particular, this communication is necessary for the associated images 120 to be displayed as described herein above when a user mouses over the banner advertisement 80. The ability for the banner advertisement 80 and the images 120 to communicate is achieved by causing them both to be served to the display page 90 from a single source.

In iframe display method 950, a browser 965 under the control of a user makes a request for a Pointroll advertisement to a third party adserver 970 as depicted in block 910a. The request to the third party adserver 970 is represented in FIG. 11B as being transmitted to the third party adserver 970 by way of path 910b. In response to the request for the Pointroll advertisement from the browser 965 the third party adserver 970 serves a Pointroll ad tag as depicted in block 920a. The Pointroll ad tag is served by way of path 920b and is received by the Pointroll ad server 975.

As depicted in block 930a, the Pointroll ad tag references a corresponding publisher side Pointroll advertisement file hosted by the publisher 980. The reference to the publisher side advertisement file is represented by path 930b. When the publisher side Pointroll advertisement file is referenced in this manner it calls the Pointroll ad server 975 by way of path 940b as depicted by block 940a. The Pointroll ad server 975 then serves the advertisement to the browser 965 by way of path of 950b as depicted in block 950a. The serving of the Pointroll advertisement is then complete as shown in block 960. In this manner both the banner and the associated images are served to the browser 965 from the same source, the Pointroll ad server 975. As previously described, this permits the banner and the associated images to communicate with each other within a Javascript iframe environment.

As should be appreciated from the foregoing the subject invention offers various advantages over systems of the prior art, e.g., (1) it enables one to inform the user of available links to other sites without requiring the user to click on the advertisement, (2) it allows advertisers to present alternative links to users in order to encourage users to visit the advertisers' website, (3) it provides images associated with a primary image wherein the associated images are enabled in response to applying an indicator to the primary image, (4) it provides a frame within a visual display wherein a primary image displayed within the frame has substantially similar image properties, such as scrolling properties, as the primary image, (5) it provides a frame within a visual display wherein a primary image displayed within the frame has associated images and the associated images are enabled in response to applying a mouse indicator to the primary image, (6) it provides a method for determining an association between an associated image and a primary image for displaying the associated image in response to applying a mouse indicator to the primary image, and (7) it provides a method for altering the associations between the associated images of a primary image and the primary image for displaying differing associated images in response to applying a mouse indicator to the primary image.

Although the invention has been shown and described in a preferred form with a certain degree of particularity, it is to be understood by those skilled in the art that the present disclosure has been made only by way of example, and that numerous modifications to the method may be made without departing from the spirit and scope of the invention as hereinafter claimed. It is intended that the patent shall cover by suitable expression in the appended claims whatever features of invention disclosed. Without further elaboration, the foregoing so fully illustrates the invention that others may, by applying current or future knowledge, readily adapt the same for use under various conditions of service.

What is claimed is:

1. A method for delivering information to a person accessing a banner website from a terminal located remote from the source of said banner website, the terminal having an associated display device upon which the content of the website is visually perceived by a person using said terminal and a cursor whose position is controllable by said person, comprising the steps of:

(a) serving initial signals from said source of said website or from another remote source by means of Javascript when said website is accessed by said person to provide a banner display of a banner area on said display device during a display time period, said banner display area including a plurality of banner sub-areas formed from said serving of initial signals and banner advertising message information that is visually perceivable by said person during said display time period when said website is accessed;

(b) providing a plurality of additional visually perceivable images, each banner sub-area being associated with an additional visually perceivable image of said plurality of additional visual images to provide a first set of associations between said banner sub-areas and said additional visually perceivable images;

(c) maintaining said set of associations during said display time period;

(d) enabling said person to select one of said banner sub-areas of said banner display to provide a selected banner sub-area, whereupon said person is provided by means of Javascript with a display of selected additional visually perceivable advertising message information associated with said selected banner sub-area in accordance with said first set of associations during said display time period;
(e) recording parameters representative of the performance of said additional visually perceivable images to provide recorded performance parameters;
(f) optimizing at least one parameter in accordance with optimization criteria and said recorded performance parameters to provide optimized parameter information;
(g) altering said associations between said banner sub-areas and said associated additional visually perceivable images in accordance with said optimized parameter information to provide a second set of associations between said banner sub areas and said additional visually perceivable images, said second set of associations differing from said first set of associations;
(h) maintaining said second set of associations during said second display time duration;
(i) repeating steps (a) to (g) using the same additional visually perceivable images and differing optimization criteria to provide differing sets of associations between said banner sub-areas and said additional visual images during differing display time periods.

2. The method of claim 1, wherein the additional visually perceivable image is provided substantially outside the boundaries of said banner area.

3. The method of claim 1, wherein said additional visually perceivable image includes audio information.

4. The method of claim 1, wherein said additional visually perceivable image includes video information.

5. The method of claim 1, wherein said additional visually perceivable image comprises mixed media information.

6. The method of claim 1, wherein said additional visually perceivable image remains perceivable to the person as long as said cursor is positioned on said selected sub-area.

7. The method of claim 6, wherein said additional visually perceivable image is displayed in a selected region adjacent said selected banner sub-area and said additional visually perceivable image remains perceivable to the person as long as said cursor is positioned on said selected banner sub-area.

8. The method of claim 7, wherein said additional visually perceivable information contains link information for linking said person to a further website when said person clicks on said selected region.

9. The method of claim 1, wherein said initial signals carry instructions necessary for enabling said terminal to establish said additional visually perceivable image when in receipt of appropriate data.

10. The method of claim 9, wherein said method further comprises the step of re-accessing said source of said website or accessing another source for receiving the data upon which said instructions operate to provide said additional visually perceivable image.

11. The method of claim 1, further comprising the steps of:
(a) receiving said visually perceivable banner images;
(b) receiving said additional visually perceivable images; and
(c) specifying a placement of said additional visually perceivable image with respect to said visually perceivable banner information.

12. The method of claim 11, comprising the steps of:
(a) receiving first identification data representative of said visually perceivable banner information;
(b) receiving second identification data representative of said additional visually perceivable information; and
(c) displaying said visually perceivable banner information and said additional visually perceivable images in accordance with said first and second identification data.

13. The method of claim 12, further comprising the step of building a use map in accordance with said first and second identification data.

14. The method of claim 13, wherein the step of providing said additional visually perceivable information comprises the steps of:
(a) building a pop-up function in accordance with said additional visually perceivable information;
(b) adding hypertext markup language information to said pop-up function to provide an enhanced pop-up function; and
(c) displaying said visually perceivable banner information and said additional perceivable banner images in accordance with said enhanced pop-up function.

15. The method of claim 1, further comprising the steps of altering said associations between said sub-areas and said respective additional visually perceivable banner information in accordance with predetermined recorded performance parameters.

16. The method of claim 1, further comprising the steps of altering said associations between said sub-areas and said respective additional visually perceivable banner information in accordance with recorded performance parameters selected after said altering of said associations between said banner sub-areas and said respective additional visually perceivable image.

17. The method of claim 1, further comprising the steps of:
(a) transmitting a request having request information to a server database on a further website containing stored visually perceivable information in response to said positioning of said cursor on said selected sub-area;
(b) selecting said additional visual information from said stored visual information in response to said request information; and
(c) transmitting said selected stored visual information to said banner website.

18. The method of claim 1, wherein said terminal provides a terminal display having a display iframe comprising the steps of displaying said visually perceivable banner information within said display iframe and displaying said additional visually perceivable information in response to positioning said cursor on said iframe.

* * * * *